(No Model.)  2 Sheets—Sheet 1.
A. D. SEWELL.
SIDE HILL SULKY PLOW.
No. 311,041.  Patented Jan. 20, 1885.
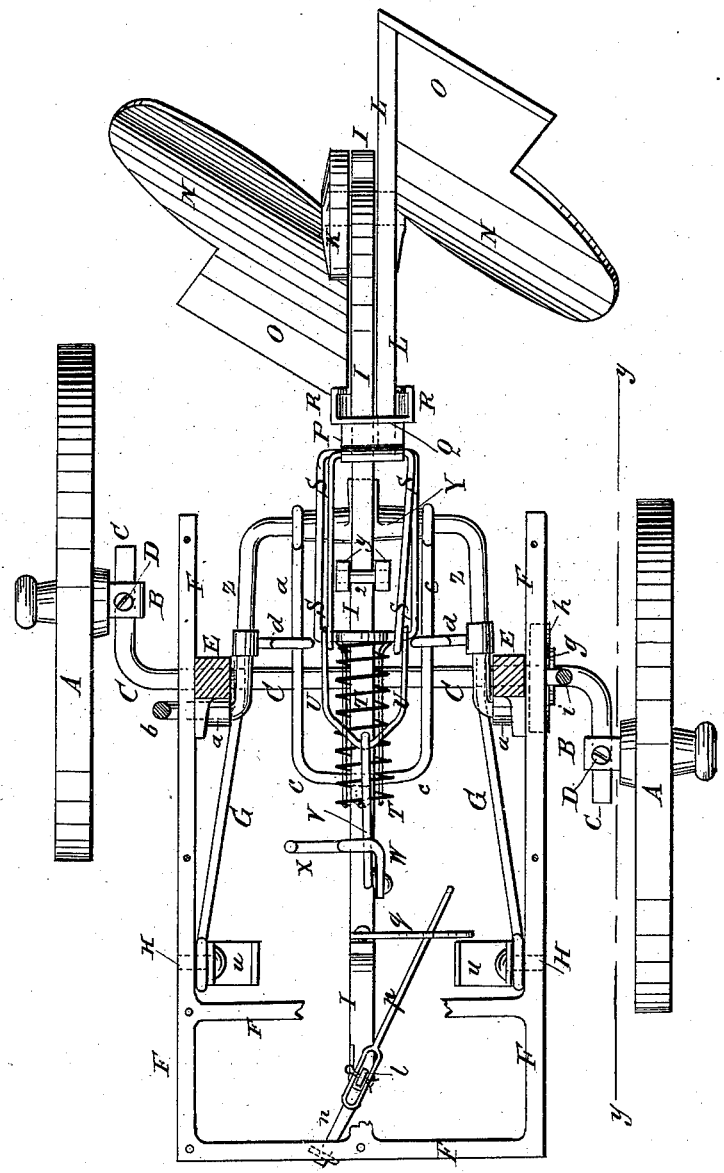
WITNESSES:
INVENTOR:
A. D. Sewell
BY Munn & Co
ATTORNEYS.

(No Model.) 2 Sheets—Sheet 2.
A. D. SEWELL.
SIDE HILL SULKY PLOW.
No. 311,041. Patented Jan. 20, 1885.
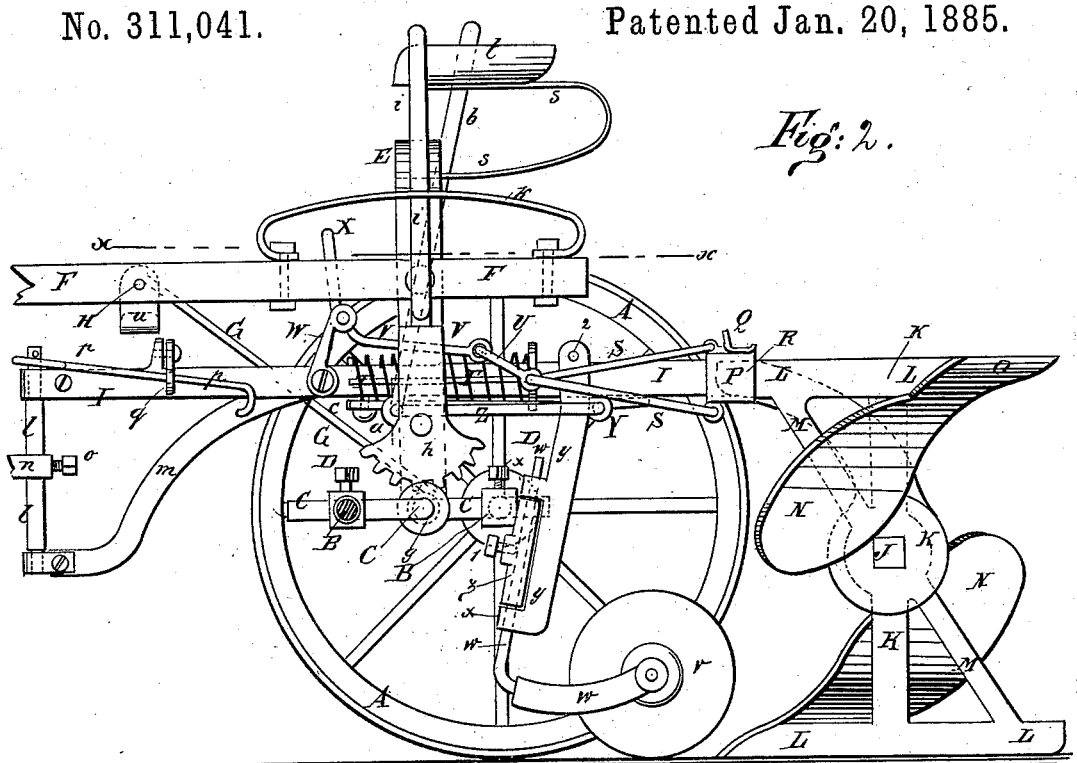
Fig: 2.
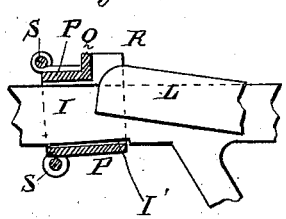
Fig: 4.
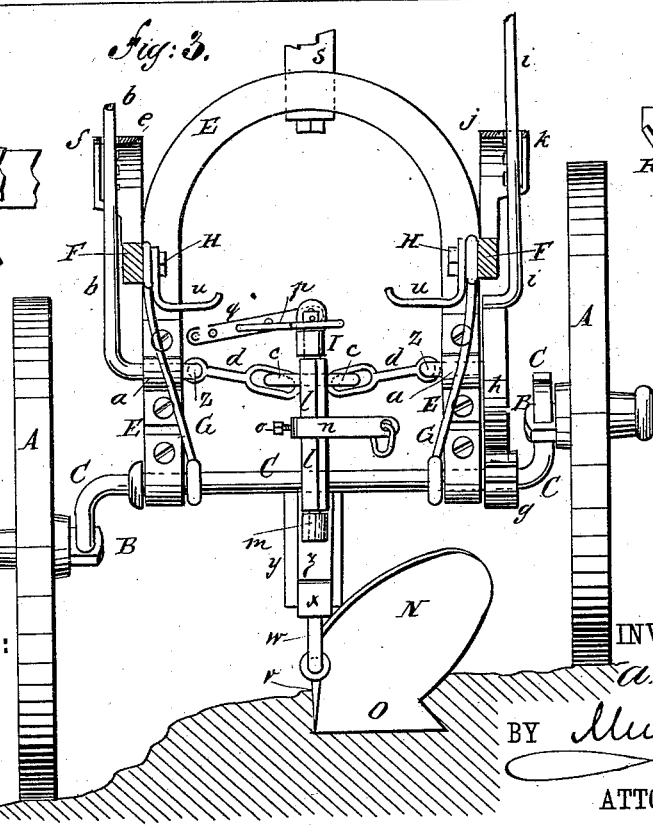
Fig: 3.
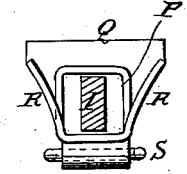
Fig: 5.
WITNESSES:
Chas. Nida.
C. Sedgwick
INVENTOR:
A. D. Sewell
BY Munn & Co.
ATTORNEYS.

UNITED STATES PATENT OFFICE.

ADDISON DAVID SEWELL, OF COLTON, WASHINGTON TERRITORY.

SIDE-HILL SULKY-PLOW.

SPECIFICATION forming part of Letters Patent No. 311,041, dated January 20, 1885.

Application filed June 30, 1884. (No model.)

*To all whom it may concern:*

Be it known that I, ADDISON DAVID SEWELL, of Colton, in the county of Whitman and Territory of Washington, have invented certain new and useful Improvements in Side-Hill Sulky-Plows, of which the following is a full, clear, and exact description.

Reference is to be had to the accompanying drawings, forming part of this specification, in which similar letters of reference indicate corresponding parts in all the figures.

Figure 1, Sheet 1, is a plan view of my improvement, partly in section through the line $x$ $x$, Fig. 2, and parts being broken away. Fig. 2, Sheet 2, is a side elevation of the same, partly in section through the line $y$ $y$, Fig. 1. Fig. 3, Sheet 2, is a front elevation of the same, the frame being shown in section. Fig. 4, Sheet 2, is a sectional side elevation of the sliding catch, the plow-heel and a part of the plow-beam being shown in side view. Fig. 5, Sheet 2, is a rear elevation of the sliding catch, the plow-beam being shown in section.

The object of this invention is to provide side-hill sulky-plows constructed in such a manner that they can be readily controlled and will be reliable in operation.

The invention consists in a side-hill sulky-plow constructed with two plows rigidly connected with each other in reversed positions and pivoted to a plow-beam provided with a locking mechanism. Upon the plow-beam is placed a spiral spring and a foot-lever connected with the said beam and the locking sleeve, whereby the plows will be locked automatically and can be readily released. The plow-beam and the arched bar are connected by a crank provided with a lever and bail and its guides, whereby the beam and its attachments can be readily raised and lowered and will be held in a horizontal position. The axle has its end parts bent at right angles in opposite directions, and is provided with a gear-wheel meshing into a gear-segment provided with a lever, whereby the said axle can be readily turned to adjust the level of the wheels. Upon the crank-arms of the axle are secured adjustably by suitable mechanism the journals of the wheels, whereby the said journals can be readily adjusted at any desired distance from the axis of the said axle. With a vertical bar pivoted to the plow-beam and carrying a horizontal draw-bar is attached a lever adjustably connected with a bar hinged to the plow-beam, whereby the point of draft attachment can be readily changed from one side of the plow-beam to the other, as will be hereinafter fully described.

A are the wheels, the journals B of which have square transverse holes through their inner ends to receive the squared ends of the axle C. The journals B are secured adjustably to the arms of the axle C by set-screws D, which pass in through one side of the said journals and rest against the side of the axle C. The axle C rocks in bearings attached to the ends of the arched bar E, to the upper part of the arms of which are attached the side bars of the frame F. The frame F is strengthened in position by braces G, the forward ends of which are secured to the forward parts of the side bars of the frame F by bolts H. The rear ends of the braces G have eyes formed in them to receive the axle C, and are placed upon the said axle at the inner sides of the ends of the arched bar E, so that the said braces will not interfere with the rocking movements of the said axle C.

I is the plow-beam, which passes through the space between the axle C and the bend of the arched bar E. The rear part of the plow-beam I is curved downward, and has its end enlarged, flattened upon its sides, rounded upon its edges, and perforated to receive the cylindrical middle part of the pivot J. The ends of the pivot J are squared to fit into square holes in the upper ends of the standards K. The standards K are placed in reversed positions and their upper ends are enlarged, rounded upon the edges, and flattened upon the inner sides, to rest squarely against the opposite sides of the enlarged rear end of the beam I. The lower ends of the standards K are rigidly attached to or formed solidly upon the foot L, the connections being strengthened by a brace, M, formed upon or attached to the said standard and foot.

N is the mold-board, and O is the shear, which are formed and secured to the foot and standard in the ordinary manner.

In the lower edge of the plow-beam I, a little in front of its bend, is formed a notch, I′, having a short vertical rear side and a long inclined forward side, to serve as a stop for the sleeve P, as and for the purpose hereinafter described.

Upon the beam I is placed the sleeve P, the interior of which is made of sufficient width to receive the extended heel of one of the plow-feet L. Upon the rear edge of the top of the sleeve P is formed an upwardly-projecting flange, Q, and upon the rear edges of the sides of the said sleeve are formed flanges R, which project to the rearward and incline outward from their upper ends. The flanges P Q thus serve as guides to direct the heel of the plow-standard into place, and as inclines to cause the said heel to move the said sleeve to one or the other side, so that the said heel can enter the sleeve at the side of the beam I.

To the upper and lower edges of the forward end of the sleeve P are hinged two bails, S, the arms of which, at the opposite sides of the beam I, are attached to the rear end of a spiral spring, T, or other suitable spring placed upon the beam I, and the forward end of which is connected with the said beam. The arms of the lower bail, S, pass along the opposite sides of the beam I within the spring T, so that the pressure of the said spring will center the sleeve P, when left free, upon the said beam I, as shown in Fig. 5, so that a heel of a plow can enter the said sleeve upon either side of the said beam.

With the forward ends of the bails S is connected, by a bail or clevis, U, the rear end of a connecting-rod, V, the forward part of which is bent upward, and its forward end is pivoted to the foot-lever W. The lower end of the foot-lever W is pivoted to the side of the beam, and its upper part is inclined forward, and has a foot-rest, X, formed upon or attached to its upper end, so that it can be conveniently operated by the driver with his foot to draw the locking-sleeve P forward and release the heel of the plow-foot L, so that the plows can revolve.

To the lower side of the plow-beam I, a little in the rear of the axle C, is attached a bearing, Y, in which rocks a crank, Z. The shaft of the crank Z rocks in bearings $a$, attached to the arms of the arched bar E, and to one end of the said shaft is attached, or upon it is formed, a lever, $b$, which projects upward into such a position that it can be readily reached and operated by the driver from his seat.

To the crank Z, upon the opposite sides of the beam I, are attached the ends of a bail, $c$, which is pivoted at its center to the under side of the beam I, and which is kept in proper position by the slotted guides $d$, the outer ends of which are hinged to the arms of the crank Z. With this construction the bail $c$ holds the beam I in a horizontal position while being moved up and down by the crank Z. The lever $b$ moves along a toothed catch-bar, $e$, against which it is held by a spring-rod, $f$, so that the said lever $b$ and the crank, plow-beam, and plows connected therewith will be held securely in any position into which they may be adjusted. The catch-bar $e$ and the spring-rod $f$ are attached at their ends to a side bar of the frame F.

To the axle C, at the outer side of the end of an arm of the arched bar E, is attached a cog-wheel, $g$, into the teeth of which mesh the teeth of a cogged segment, $h$, pivoted to the arm of the arched bar E, and having a lever, $i$, formed upon or attached to it. The lever $i$ projects upward into such a position that it can be readily reached and operated by the driver to turn the axle C to raise one wheel A to run upon the unplowed land and the other wheel to run in the furrow, so that the position of the said wheels can be readily reversed, according as the right-hand or the left-hand plow is to be used. The lever $i$ moves along a toothed catch-bar, $j$, against which it is held by the spring-rod $k$. The ends of the catch-bar $j$ and the spring-rod $k$ are attached to the side bar of the frame F.

To the forward end of the plow-beam I is pivoted the upper part of the vertical bar $l$, the lower end of which is pivoted to the lower forward end of a bracket or brace arm, $m$, attached at its upper end to the said plow-beam I.

$n$ is the draw-bar, in the rear end of which is formed a hole to receive and slide upon the vertical bar $l$. The bar $n$ is secured adjustably to the bar $l$ by a set-screw, $o$, which passes in through the end of the said bar $n$ and rests against the side of the said bar $l$. To the forward end of the bar $n$ is attached a ring or other coupling to receive the draft. The upper end of the vertical bar $l$ is flattened or squared to fit into a short slot formed in the forward end of the short lever $p$, the rear end of which passes through a hole in the bar $q$, the inner end of which is hinged to the upper side of the beam I. Several holes are formed in the bar $q$ to receive the lever $p$, so that the said lever can be adjusted to stand at any desired inclination with the plow-beam I. The lever $p$ is secured to the bar $l$ in the same vertical plane with the draw-bar $n$, so that the said draw-bar $n$ and lever $p$ will always stand at the same inclination with the plow-beam I, but upon the opposite sides of the said beam. With this construction the driver with his toe can readily swing the bar $q$ from one side of the beam I to the other, and thus change the point of draft attachment from one side to the other of the line of the said beam to regulate the line of draft, according as the plow upon one or the other side of the said beam is to be used.

To the centers of the forward cross-bars of the frame F, when two or four horses are to be used, is rigidly attached the tongue $r$, by means of which the machine is guided. When three horses are to be used, the tongue $r$ should be attached to the right-hand part of the frame F.

To the center of the arched bar E is attached one arm of the U-spring s, to the other arm of which is attached the drivers's seat t.

To the inner sides of the side bars of the frame E are secured by the bolts H the rests u for the driver's feet.

v is the rotary colter, which is pivoted to the forked rearwardly-inclined lower end of the standard w. The upper part of the standard w is vertical, and passes through bearings in lugs x, formed upon the hangers y, and through a sleeve, z, interposed between the said lugs y. The standard w is secured in place adjustably by a set-screw, 1, which passes in through a screw-hole in the side of the sleeve z and rests against the side of the said standard w, so that by loosening the set-screw 1 the colter can be adjusted to cut any desired depth in the ground. The upper end of the hanger y is forked to receive the beam I, and is secured to the said beam by a bolt, 2, passing through the projecting ends of the branches of the said hanger.

In using the machine, when the end of the furrow is reached, the plowman presses the lever W forward with his foot to withdraw the sleeve P from the heel of the upper plow and allow the pressure of the ground against the lower plow to force the said plow back, and thus roll it out of the ground, lowering the upper plow. The sleeve P must be held forward until the point of the upper plow, in its downward movement, has passed the said sleeve, when the lever W can be released and the spring T allowed to force the said sleeve back until the rear edge of its lower side strikes the straight side of the notch I', where it is held in position ready to engage with the heel of the lower plow as it comes into place. The notch I' prevents the sleeve P from being pushed back so far by the spring T that the heel of the plow would come down upon the top of the said sleeve, and thus be prevented from becoming locked. As the heel of the plow strikes the bottom of the sleeve it forces the rear edge of the said bottom out of the notch I' and allows the said sleeve to be pushed back by the said spring T, locking the plow in place. As the lower plow begins to roll out of the ground the lever b is operated to raise the beam I and the attached plows above the ground. As the plow comes into place for starting the return furrow, the plowman operates the lever i to lower the higher wheel to run in the furrow and to raise the lower wheel to run upon the unplowed land. The lever b is then operated to lower the plow-beam and plows into the working position. As the plows come into working position the plowman, with his toe, swings the bar q and lever p to the other side of the plow-beam I, which shifts the point of draft attachment to the other side of the central line of the machine and brings it into line with the center of resistance. The difference in level between the wheels A is regulated by adjusting the positions of the journals B upon the arms of the axle C, but both journals B should be at exactly the same distance from the axis of the said axle C, so that the furrows may all be of the same depth.

Having thus described my invention, what I claim as new, and desire to secure by Letters Patent, is—

1. In a side-hill sulky-plow, the combination, with a beam, of two plows rigidly connected with each other in reverse position and pivoted to the beam to revolve in the direction of the line of draft, a sliding sleeve on said beam, and means for sliding the said sleeve back and forth on the beam, substantially as herein shown and described.

2. In a side-hill sulky-plow, the combination, with the plow-beam I, of two plows rigidly connected with each other in reversed positions and pivoted to the plow-beam, the locking-sleeve P, the spiral spring T, and the foot-lever W, substantially as herein shown and described, whereby the said plows will be locked automatically and can be readily released, as set forth.

3. In a side-hill sulky-plow, the combination, with the plow-beam I and the arched bar E, of the crank Z, the bail c, the guides d, and the lever b, substantially as herein shown and described, whereby the plow-beam and its attachments can be readily raised and lowered, and will be held in a horizontal position, as set forth.

4. In a side-hill sulky-plow, the combination, with a beam, I, and two plows rigidly connected together in reverse positions and pivoted to the beam, of the sliding sleeve P, provided with the upwardly-projecting flange Q, the rearwardly-inclined side flanges, R, and means for operating the said sleeve, substantially as herein shown and described.

5. In a side-hill sulky-plow, the combination, with the vertical pivoted bar l, carrying a horizontal draw-bar, n, and the plow-beam I, of the adjustable lever p and hinged bar q, substantially as herein shown and described, whereby the point of draft attachment can be readily changed from one side of the plow-beam to the other, as set forth.

ADDISON DAVID SEWELL.

Witnesses:
W. J. DAVENPORT,
M. B. JENKINS.